R. F. BALLARD.
DISPENSING GROCERY CABINET.
APPLICATION FILED JUNE 17, 1908.

921,941.

Patented May 18, 1909.
4 SHEETS—SHEET 1.

Witnesses:
B. J. Rotkoski
R. B. Smith

Inventor
R. F. Ballard
By A. L. Jackson
Attorney

R. F. BALLARD.
DISPENSING GROCERY CABINET.
APPLICATION FILED JUNE 17, 1908.

921,941.

Patented May 18, 1909.
4 SHEETS—SHEET 2.

Witnesses:

Inventor
R. F. Ballard.
By A. L. Jackson
Attorney

R. F. BALLARD.
DISPENSING GROCERY CABINET.
APPLICATION FILED JUNE 17, 1908.
921,941.
Patented May 18, 1909.
4 SHEETS—SHEET 3.
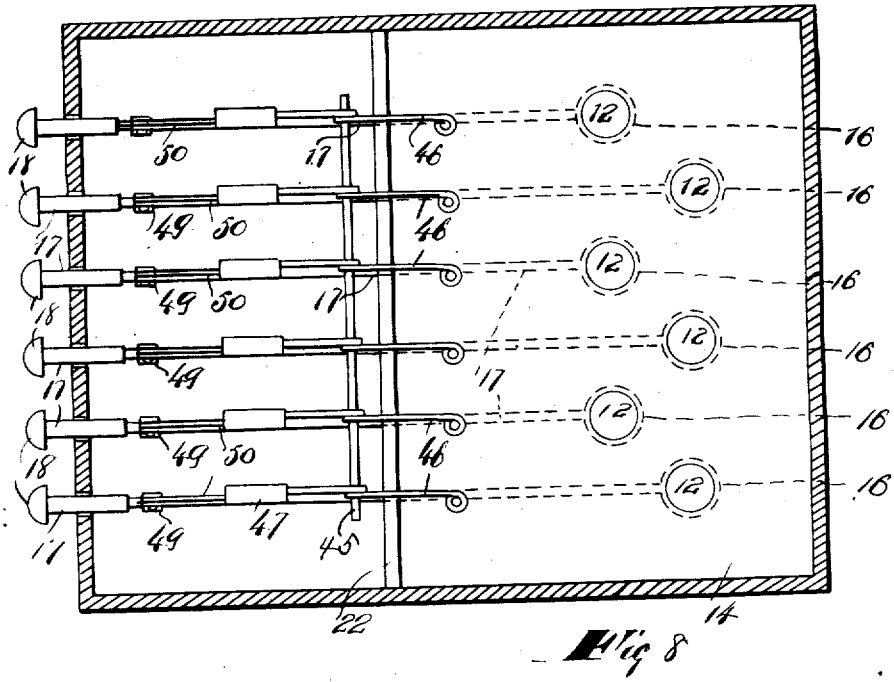
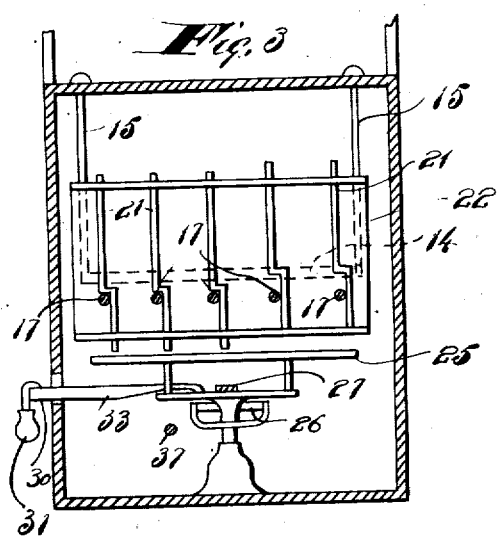
Witnesses
B.) Lorkowski
JW Stitt
Inventor,
R F Ballard,
A. D. Jackson,
Attorney

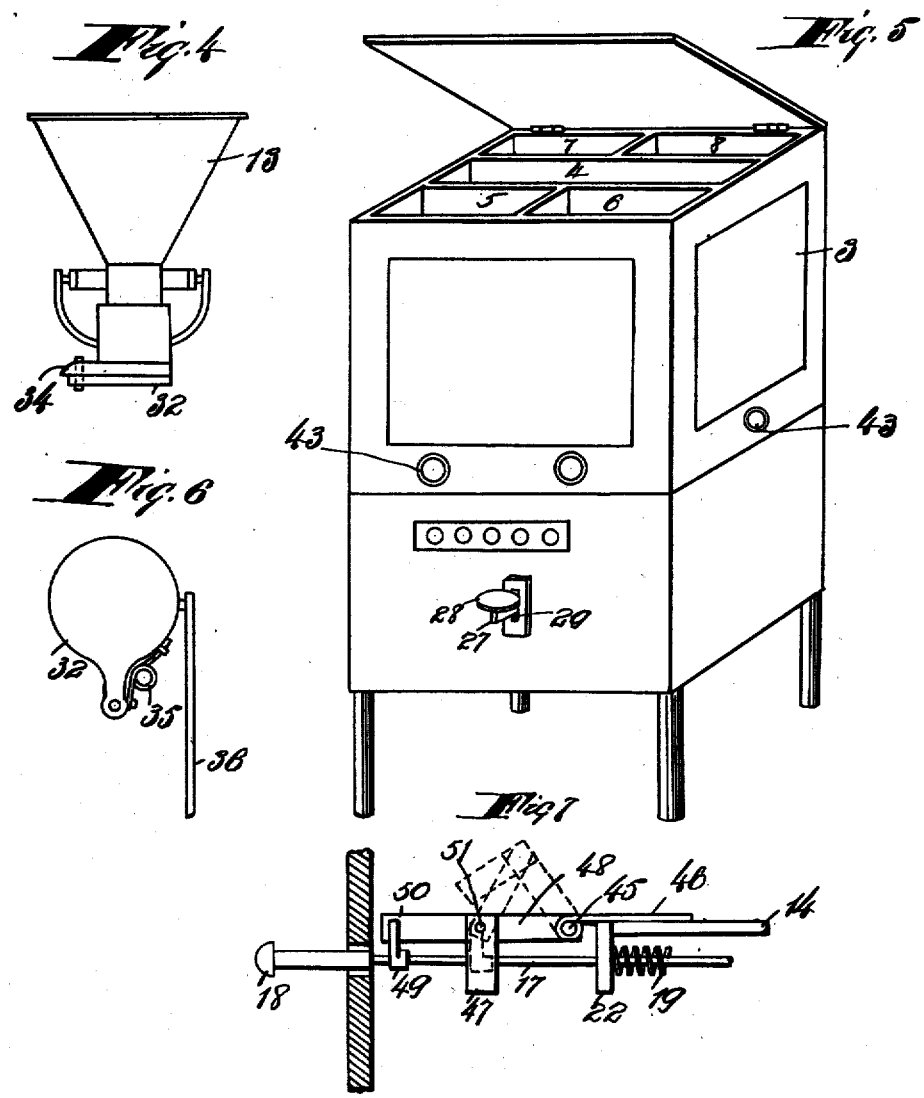

UNITED STATES PATENT OFFICE.

RUFUS F. BALLARD, OF FORT WORTH, TEXAS.

DISPENSING GROCERY-CABINET.

No. 921,941.  Specification of Letters Patent.  Patented May 18, 1909.

Application filed June 17, 1908. Serial No. 438,916.

*To all whom it may concern:*

Be it known that I, RUFUS F. BALLARD, a citizen of the United States, residing at Fort Worth, Texas, have invented certain new and useful Improvements in Dispensing Grocery-Cabinets, of which the following is a specification.

My invention relates to cabinets and particularly to cabinets for use in grocery stores, seed stores, and the like, and the object is to provide cabinets for containing various kinds of goods in separate compartments which have outlets to a common hopper and to provide means in combination with the compartments for opening the same and weighing goods that may be discharged from any compartment, and to provide means in combination with the weighing means and the opening and closing means to cut off the flow of goods automatically as soon as a predetermined quantity of goods has been deposited in the hopper.

One of the advantages of this invention is that the attendant or operator does not have to hold the compartment open. The operator can thus have time to attend to other matters. A second hopper is provided so that the operator can wrap up one quantity of goods while another quantity is being delivered from one of the compartments.

The principal object is to provide apparatus which is simple in construction and operation and which will save much time and afford the greatest possible convenience in vending goods.

Other provisions are for advertising and indicating the kind of goods contained in each compartment.

Other objects and advantages will be fully explained in the following description and the invention will be more particularly pointed out in the claims.

Reference is had to the accompanying drawings which form a part of this application and specification.

Figure 1:
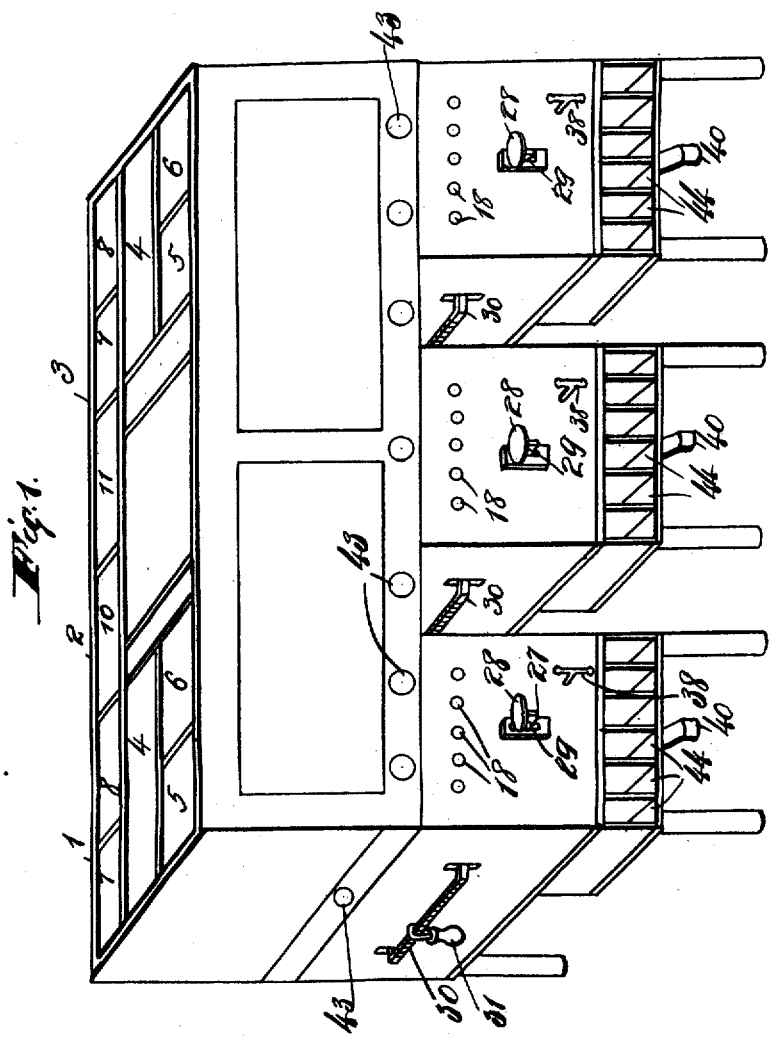
Figure 2:
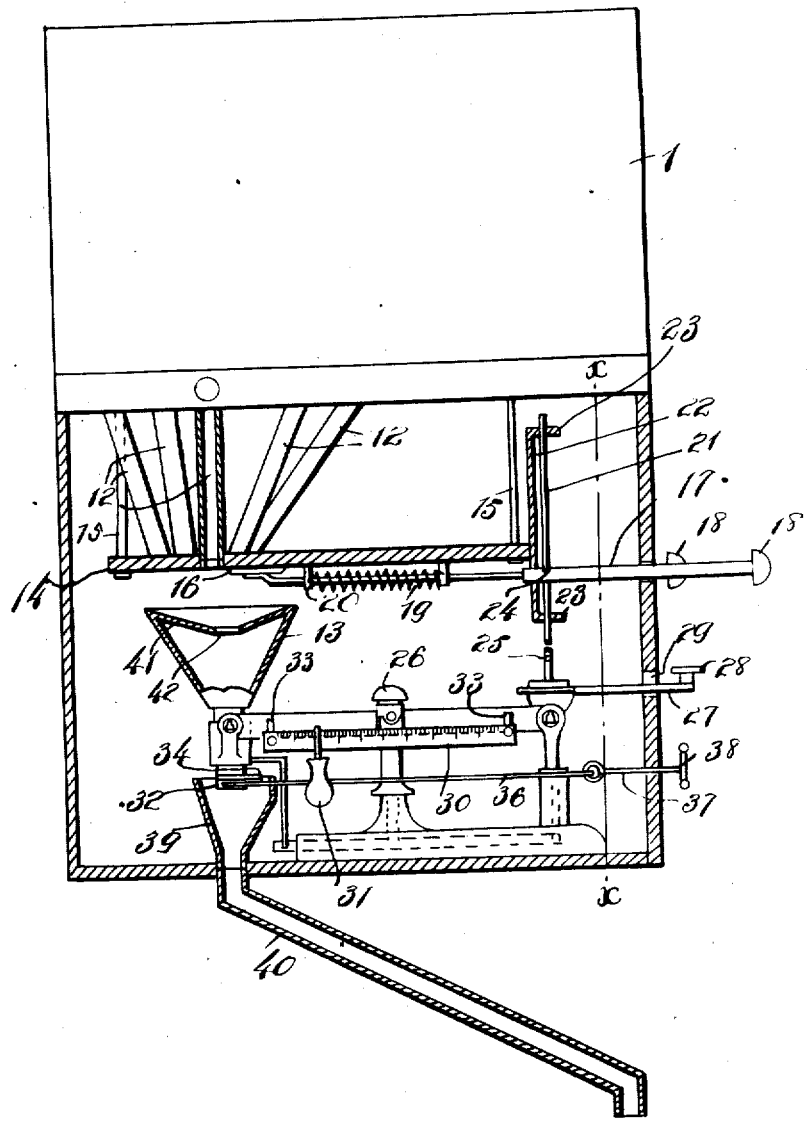

Figure 1 is a perspective view of a cabinet in three sections. Fig. 2 is a side elevation of one of the sections, partly in section to show the construction of the interior operating parts. Fig. 3 is a vertical section, taken along the line x x of Fig. 2. Fig. 4 is a side elevation of the receiving hopper, looking at the left side of Fig. 2. Fig. 5 is a perspective view of one of the cabinet sections. Fig. 6 is a bottom view of the closing means of the hopper shown in Fig. 4. Fig. 7 illustrates a variation in the tripping means for the automatic closing of the compartments or bins. Fig. 8 is a plan view of the tripping means shown in Fig. 7, also illustrating the manner of closing the compartments when the tripping means have been actuated.

Similar characters of reference are used to indicate the same parts throughout the several views.

A cabinet in three sections is illustrated in the drawings, each section being provided with separate dispensing means. The sections 1, 2, and 3 are located in a common casing for the three sections. The sections 1 and 3 each have compartments 4, 5, 6, 7, and 8. The section 2 has compartments 9, 10, and 11. Each compartment is provided with a pipe 12 which leads to a common hopper 13, or to a hopper 13 which is common to all the compartments of a section. The pipes 12 all terminate in a platform 14 which is suspended from the bottom of the section by rods 15. A slide 16 closes the mouth of each pipe 12. Each slide 16 is attached to a pull rod 17 which is provided with a button 18. The slides 16 are held normally closing the pipes 12 by spiral springs 19 which are mounted on the rods and attached to the guide bar 20 which is rigid with the bottom of the platform 14 through which the pull rods pass and the springs are attached to the rods 17. A pull on the rod 17 will open the pipe 12, but as soon as the rod is released the spiral spring 19 will cause the rod to shove the slide 16 across the bottom of the pipe 12. The name of the article of goods may be printed or otherwise placed on the button, each button bearing the name of the goods in the corresponding compartment or bin. Means are provided for holding the slides 16 open. Keys 21 are mounted on the guide-board 22. The guide board 22 has ledges 23 through which the ends of the keys move freely. Each pull rod 17 has a notch 24 therein and each key 21 has a bend or portion at right angle to the body of the key. This bend is adapted to drop into the notch 24 when the pull rod is drawn far enough outward to open a slide 16. When a key drops into the notch in the pull rod the rod is held until the key is tripped out of the notch 24. Means are provided for tripping the keys 21 automatically. A tripping bar 25 is mounted on the beam of a scale 26. The hopper 13 is mounted on the other end of the scale beam. As soon as the predetermined quantity of goods falls into the hopper 13, the bar 25 will trip the key 21 which operation releases the pull bar 17. The retractile spring 19 will cause the pull rod to close the mouth of the pipe 12 with the slide 16. The scale has an arm 27 projecting out of the front of the cabinet and this arm bears a weight seat 28, the front of the cabinet having a slot 29 for the movement of the arm 27. The weight representing the quantity of goods wanted is placed on the seat 28. An additional scale beam 30 is attached to the scale so that small fractions of pounds may be indicated by a pea 31 which is movable on the beam 30. The tripping bar 25 is arranged relative to the keys 21 so that a very slight movement of the bar will trip the key which is resting in the notch in one of the pull rods 17. The beam 30 is attached to the scale by means of arms 33 which extend outside of the cabinet casing. With a cabinet arranged as above described, the goods having been placed into compartments, the kind and quantity of goods can be obtained by placing the weight representing the quantity of goods wanted on the seat 28 and by pulling the button 18 which bears the name of the goods wanted. Goods will be discharged from the proper compartment into the hopper 13 and as soon as the amount of goods fall into the hopper, the beam 25 will trip the key and cut-off the discharge.

The bottom of the hopper is provided with a spring controlled door 32 which is pivotally connected with the bottom of the hopper, the hopper 13 having a flange 34 to which the door 32 is pivoted. A spring 35 holds the door 32 normally closed. A cord 36 is attached to the door and extended toward the front of the cabinet and a rod 37 is attached to the cord and extended outside of the cabinet and provided with a handle 38. After the desired quantity of goods has been deposited in the hopper 13, a pull on the cord handle 38 will let the goods be discharged through the hopper 39 and spout 40. As soon as the goods are discharged and the handle 38 released the retractile spring 35 will close the door 32. The hopper 13 has an inclined flange 41 on which the goods will first fall and slide downward the central orifice 42. The object of this flange 41 is that the weight of the goods will commence to bear on the scale as soon as possible after leaving the compartment. If there was no such flange as the flange 41, there would be a considerable dribble of goods between the door 16 and the top of the goods which would not be pressing on the scale at the moment the door was closed. The flange 41 will catch such dribble so that it will be pressing on the scale practically as soon as it is discharged from the pipe 12.

Each compartment or bin of the cabinet is provided with a glass 43 through which the goods in the compartment can be seen. In this manner the goods in the compartments are advertised. It will be noticed that every compartment is so arranged that at least one side of the compartment is formed by the main casing. The cabinets are provided with a series of pockets 44 for containing paper bags or other wrapping material. These pockets are arranged on the lower front part of the cabinet so that the wrapping material is convenient to the discharge spouts 40 and to the weights and pull buttons.

Figs. 7 and 8 illustrate a variation in the means for locking the pull rods 17 to hold the pipes 12 open. The guide board 22 is cut down to the level of the platform 21. A rod 45 is mounted in brackets 46 which are attached to the platform 21. The lock consists of the trip 47 which is rigid with the bar 48. The bar 48 is pivotally mounted on the rod 45. The pull rod 17 is connected to the lock by means of a clip 49 which is rigid with the rod 17 and by means of the link 50 which is pivotally connected to the clip 49 and pivotally connected with the lock by a pivot bolt 51. Fig. 7 shows the pull locked. When the tripping bar 25 strikes the bar 47 and moves the same high enough to overcome the dead center, the retractile spring 19 will cause the locking and connecting parts to assume the position substantially as illustrated by dotted outline in Fig. 7.

Having fully described my invention, what I claim as new and desire to secure by Letters Patent, is,—

1. A dispensing cabinet comprising a plurality of compartments, a scale carrying a hopper, a pipe connected with each compartment and adapted to discharge into said hopper, a spring controlled slide normally closing each pipe, a pull rod connected with each slide, a key adapted to lock each pull rod to hold said slide in the open position, and a tripping bar carried by said scale and adapted to unlock each pull rod.

2. A dispensing cabinet comprising a plurality of compartments, a scale carrying a hopper, a pipe connected with each compartment and adapted to discharge into said hopper, a slide for closing each pipe, a spring-actuated pull rod for each pipe carrying each slide and normally closing the pipe, each rod having a notch therein, a gravity-actuated key for engaging each rod adapted to lock the rod in open position, and a tripping beam carried by said scale adapted to unlock said pull rods.

3. A dispensing cabinet comprising a plurality of compartments, a scale carrying a hopper, a pipe connected with each compartment and adapted to discharge goods from a compartment into said hopper, a slide for closing each pipe, said pipes terminating in a platform, a slide rod having a button bearing the name of goods in the compartment to which the rod is operatively connected, said rod carrying said slide, a retractile spring holding said slide normally closed, a gravity-actuated key for locking each pull rod in an open position, and a tripping beam carried by said scale adapted to trip said key to release said rod.

4. A dispensing cabinet comprising a plurality of bins, each bin having a glass light for exposing the goods to view, a scale carrying a hopper, each bin having a pipe adapted to discharge into said hopper, a spring-controlled slide closing each pipe, a gravity key for locking each slide in the open position, means carried by said scale for unlocking said slide, a spring-actuated valve for retaining the goods in said hopper until the desired quantity of goods is obtained, and a pull rod connected to said valve and extended to the front of the machine.

5. A dispensing cabinet comprising a plurality of compartments, a weighing hopper common to all of said compartments, each compartment having a normally closed communication with said hopper, means including a spring-actuated pull rod for opening any one or all of the communications with said hopper, means for automatically locking the opening means in open position, means coöperating with said hopper for automatically unlocking said locking means whereby each communication is closed at the moment a predetermined quantity of goods is delivered to said hopper, a normally closed door for the bottom of said hopper, and a pull rod for opening said door for the discharge of goods from said hopper.

6. A dispensing cabinet having a plurality of compartments, means for displaying the goods in each compartment, a hopper in communication with each compartment, a spring-actuated pull rod for opening and closing each compartment and carrying a button indicating the kind of goods contained in the compartment with which the pull rod is operatively connected, a key adapted to engage a notch in its co-acting pull-rod, said hopper having a door and a spring holding said door normally closed, a key and cord for opening said door, and a hopper and a discharge spout adapted to receive goods discharged from said first named hopper.

In testimony whereof, I set my hand in the presence of two witnesses, this 12th day of June, 1908.

RUFUS F. BALLARD.

Witnesses:
 A. L. JACKSON,
 R. B. SMITH.